Oct. 12, 1965 A. L. BURNETT 3,210,945
SELF-PROPELLED DRY DOCK PUMPING PLANT
Filed Oct. 26, 1962 3 Sheets-Sheet 1

INVENTOR.
ARDEN L. BURNETT
BY
AGENT.

Oct. 12, 1965  A. L. BURNETT  3,210,945
SELF-PROPELLED DRY DOCK PUMPING PLANT
Filed Oct. 26, 1962  3 Sheets-Sheet 2

INVENTOR.
ARDEN L. BURNETT
BY
AGENT.

INVENTOR.
ARDEN L. BURNETT
BY
AGENT.

United States Patent Office
3,210,945
Patented Oct. 12, 1965

3,210,945
SELF-PROPELLED DRY DOCK PUMPING PLANT
Arden L. Burnett, 619 Nicholson St., Falls Church, Va.
Filed Oct. 26, 1962, Ser. No. 233,493
10 Claims. (Cl. 61—64)
(Granted under Title 35, U.S. Code (1952), sec. 266)

The invention described herein may be manufactured and used by or for the Government of the United States of America for governmental purposes without the payment of any royalties thereon or therefor.

The present invention relates to dry docks and more particularly to means for pumping water into and out of dry dock basins.

In the field of ship building and ship repair, it has been common practice for many years to use dry docks for major repairs. In using dry docks, a ship to be repaired is floated into the basin of the dry dock, the basin is sealed from surrounding water by floating caissons into position across the entrance, or alternatively by closing a gate across the entrance, and the dry dock basin is then pumped dry allowing the ship to settle on prepositioned blocks on the dry dock floor. With the advent of deeper draft ships, it was proposed to raise the level of water within the dock basin in order to position supporting blocks under the hull in cases where the draft of the ship was too great to allow positioning of the blocks on the dock floor before the ship was warped into the dock basin. By utilizing principles similar to those of the canal lock it was found that water could be pumped into the dock basin until the ship floated high enough to clear the tops of the blocks whereupon the blocks could be positioned under the ship and the basin then pumped dry. A system of this type is described in copending application Serial No. 20,504, filed April 6, 1960, now U.S. Patent No. 3,133,420 for Dry Dock Lock.

In conventional dry docks as well as those equipped with the aforementioned dry dock lock, pumps had to be provided for pumping water out of the dry dock basin, and additionally in those dry docks utilizing the dry dock lock system it was also necessary to provide pumps which could be utilized to pump water into the dry dock basin. As a result, separate dual sets of pumps were necessary for those docks equipped with the dry dock lock.

Many existing ship yards have a number of dry docks located therein. If a number of docks were equipped with the dry dock lock, dual sets of pumps would be needed for each dry dock to be so equipped. Due to the size of the pumping equipment necessary for pumping such a large volume of water, as is required in pumping water into or out of a dry dock in a practical period of time, the possibility of making portable pump installations to be used with several dry docks is desirable.

By the present invention there is provided a low cost self-propelled pumping plant which may be easily moved from one dry dock to another. The pumping plant of the present invention, although designed primarily for those dry docks equipped with a dry dock lock, also provides assistance to the main dry docking pumping plants for dewatering. It further provides standby pumping capacity for dry docks if part or all of their normal heavy dewatering pumps should be taken out of service due to breakdown, or for maintenance.

Accordingly, it is an object of the present invention to provide a low cost dry dock pumping plant.

Another object is the provision of a pumping plant which can be readily moved from one dry dock to another to aid in pumping up or dewatering dock basins equipped with a dry dock lock.

A further object of the invention is to provide a dry dock pumping plant which provides stand-by pumping capacity assistance for all dry docks in a ship yard.

Other objects and many of the attendant advantages of this invention will be readily appreciated as the same becomes better understood by reference to the following detailed description when considered in connection with the accompanying drawings in which like reference numerals designated like or corresponding parts throughout the figures thereof and wherein.

Figure 1:
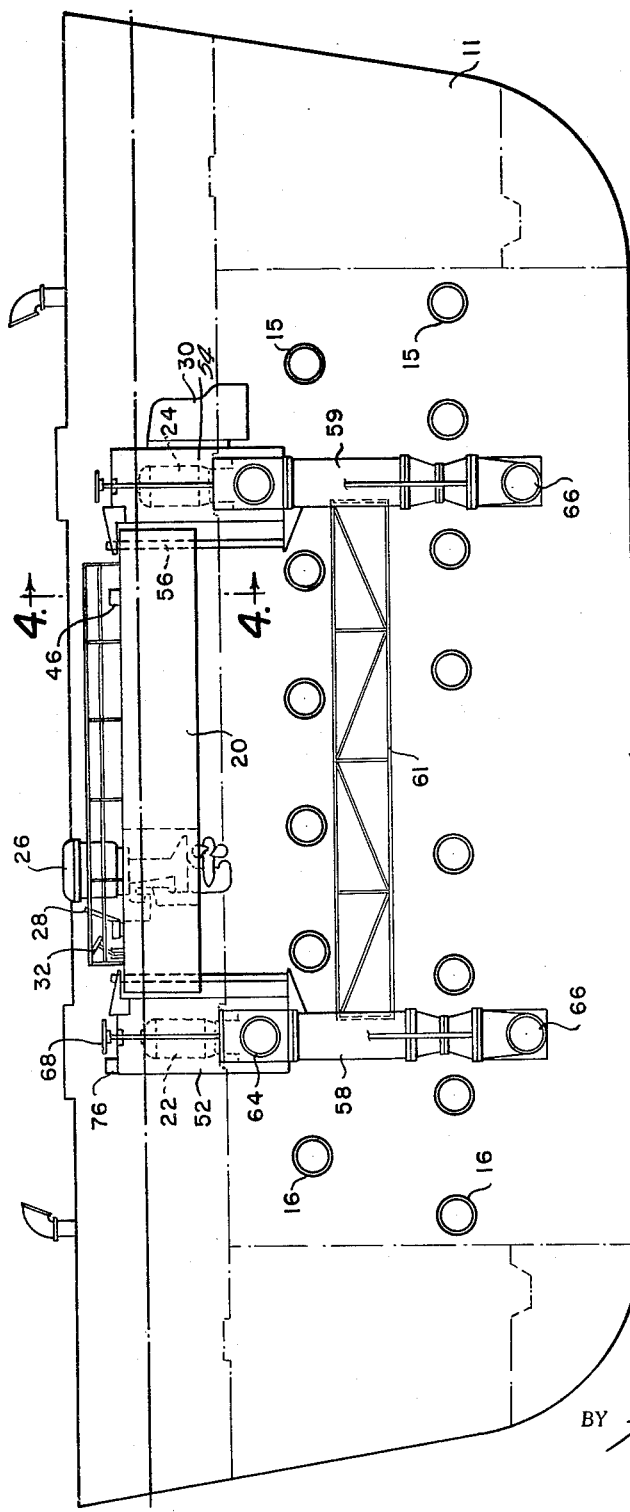
FIG. 1 is a front view in elevation of an embodiment of the present invention shown in place alongside a dry dock caisson.
Figure 3:
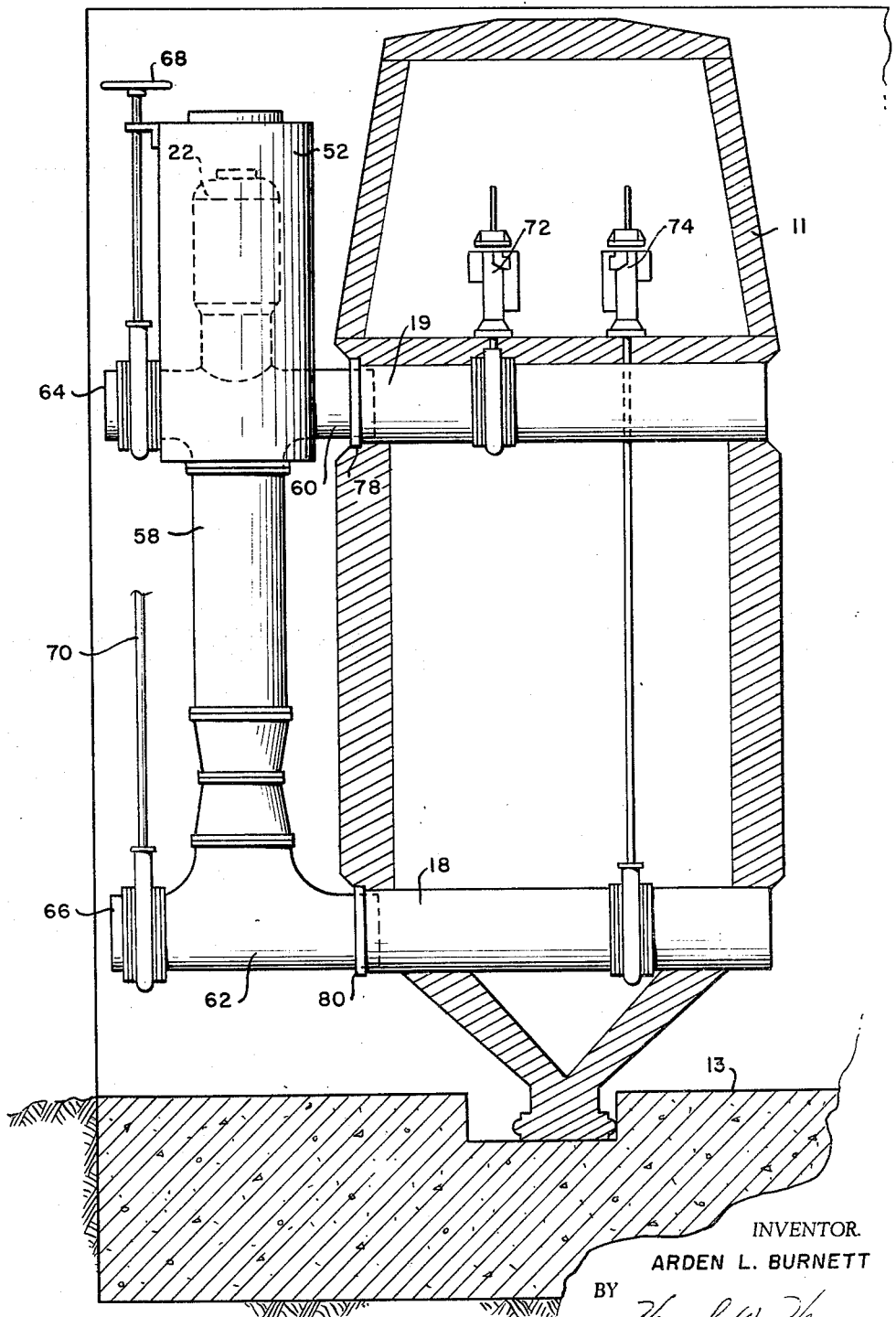
FIG. 3 is an enlarged side view in greater detail of the embodiment of FIG. 1 in position along side a caisson.

Referring now to the drawings wherein like reference numerals designate like or corresponding parts throughout the several views, there is shown in FIG. 1 a caisson 11 which is adapted to seal the open end of a dry dock 13 as may be seen in more detail in FIG. 3. The caisson 11 is of conventional construction and has interconnecting the opposite sides thereof a plurality of flooding holes 16 which are used to allow the dry dock basin to flood with water when it is desired to again launch a ship from the dry dock. Valve means which are conventional, and therefore are not shown, are used to open or close the flooding holes as desired.

Figure 2:
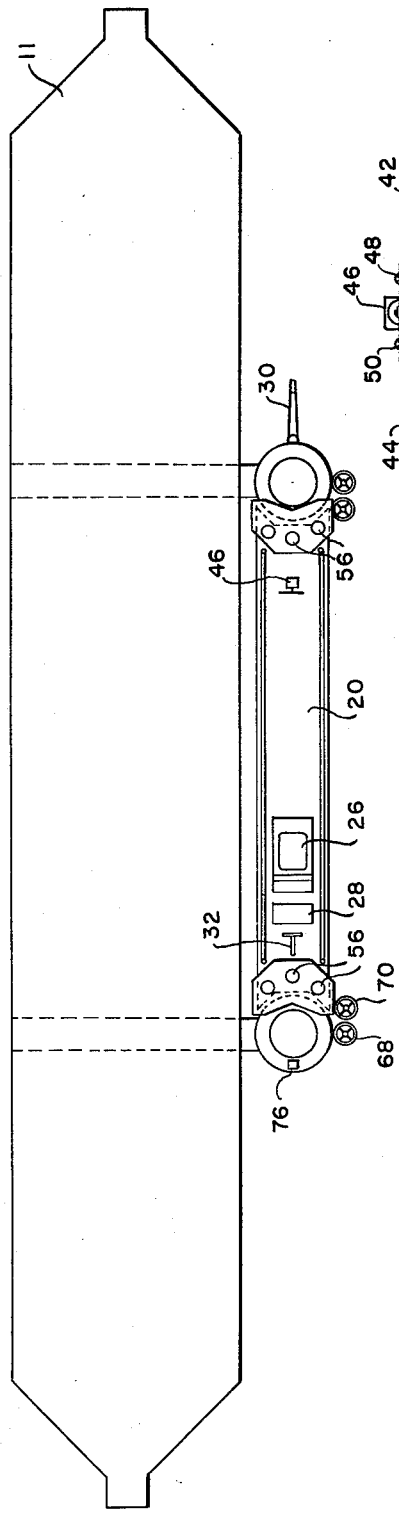
FIG. 2 is a top view of the embodiment and caisson shown in FIG. 1.

In accordance with the present invention there may be provided one or more pairs of flooding pipes 18 and 19 (FIG. 2) similar to the flooding holes 16 but in vertical alignment with one another for ease in connecting the pumping plant of the present invention as will be hereinafter described. The pumping waterborne craft carrying the plant of the present invention comprises buoyant body portion rotatable about its longitudinal axis in the form of a large floating pontoon 20 which carries one or more large pumps 22, 24 and is propelled by an outboard motor 26 which may be of any conventional type. An operator's seat 28 may be provided on the pontoon and at the rear of the pontoon-carried pumps, there may be provided an auxiliary steering rudder 30 which is controlled by a conventional steering wheel placed in front of the operator's seat. A guard rail 34 is provided around the top of the pontoon for safety.

Figure 4:
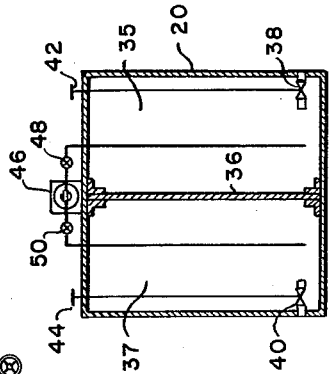
FIG. 4 is a partly schematic cross-sectional view taken through the connecting pontoon as taken along the line 4—4 of FIG. 1 and looking in the direction of the arrows.

As may be seen most clearly in FIG. 4 the pontoon 20 is divided into two longitudinal compartments separated by a divider 36. The outboard compartment 35 and inboard compartment 37 are each provided with flood holes or conduits, 38 and 40 respectively, each controlled by closure valves 42 and 44, respectively, for allowing the outboard and inboard compartments to be selectively flooded. This selective flooding enables rotation of the pontoon about its longitudinal axis. For dewatering these compartments there is provided a dewatering pump 46 having its intake controlled by an inboard valve 50 and an outboard valve 48 to selectively dewater the compartments. The necessity for the flooding holes and dewatering system will become apparent as the operation of the device is described hereinafter.

Each of the large pumps 22, 24 is enclosed in a variably buoyant body, i.e., water-tight pump casing 52, 54 respectively. Each of the pump casings are connected to the connecting pontoon 20 slidably by means of a plurality of rods 56 which are secured to the pump jackets and are designed to run through a plurality of vertical holes in the pontoon 20 for vertical movement therethrough. Below each of the pump casings 52, 54, is mounted a pump conduit 58, 59; the two pump shafts being rigidly interconnected by a support member 61.

The pumps 22, 24 are each connected to the vertical pump conduits 58 or 59 each of which has an outlet pipe 60 and an intake pipe 62 (FIG. 3) for coaction with the flood pipes 18 and 19 respectively. The outlet 62 and intake 60 are of considerably smaller diameter than the flood pipes 18 and 19 and each has a sealing collar, 78 and 80 respectively, of resilient material such as soft rubber, positioned therearound. Additionally an outlet 64 and an intake 66, controlled by valves 68 and 70 respectively, are also provided on the pump shaft 58. A pair of valves 72, 74 are also provided on the flood pipes 19, 18, respectively for selective closure thereof. A dewatering pump 76 (FIGS. 1 and 2) is provided for dewatering the pump casings 52, 54. Valve controlled flood conduits, similar to the flood conduits 38, 40 of the pontoon and controlled by similar valve means, may also be provided in each of the pump casings 52, 54 for controlling the flooding thereof.

In operation, the pumping plant, in its entirety, is propelled by means of the outboard motor 26 to a position adjacent the caisson and is temporarily tied up to the outboard side of the caisson using ropes or lines or a locking device or any suitable means. The caisson at this point may be in place and in light or heavy draft condition. The pumping plant is adjusted laterally to the approximate desired condition in alignment with the vertically displaced flooding pipes 18, 19 and the water chamber inside each of the pump casings 52 and 54 is flooded or dewatered for approximate vertical alignment of the pipes 60 and 62 with the pipes 18 and 19. Proper alignment may be simply provided by the provision of suitable indicating marks on the caisson 11 and the pontoon 20 so that the marks will coincide when the pipes 60 and 62 and pipes 18 and 19 are aligned with one another. It will be noted that by changing the buoyancy of the pump jackets without changing the buoyancy of the connecting pontoons the pump jackets can be moved up and down vertically through the slidable connection between the pontoon and the pumps. This slidable connection also takes care of rise and fall on the pontoon with tides. The pipes 60 and 62 are guided into the larger pipes 18 and 19 until the soft rubber collar 78 and 80 is engaged by the caisson at flooding holes 18 and 19. At this point the top of the caisson and the top of the pumping plant are tightly secured to one another to keep the pipes 60 and 62 from slipping out of the openings of pipes 18 and 19.

The inboard compartment 37 of the pontoon 20 is now dewatered, or the outboard pontoon 35 is flooded, in order to rotate the pontoon thereby causing the lower outlet pipe 62 of the pumping plant to slide into the opening of caisson pipe 18 up to its soft rubber collar 80. Suitable electrical power leads can now be attached to the pumps in the compartments and pumping may be commenced by opening or closing the desired caisson and pumping valve. For example, if valves 74 and 68 (FIG. 3) are opened and valves 70 and 72 are closed, water will be pumped from pipe 18 and discharged through outlet 64 thereby dewatering the dock basin. Alternatively, if valves 70 and 72 are opened and valves 68 and 74 are closed, water will be pumped into intake 66 and discharged into the dock basin through pipe 19.

Thus there has been described a system and method for pumping water into the dry dock or dewatering a dry dock through a caisson from a source outboard of the caisson. This system is simple and economical.

Obviously many modifications and variations of the present invention are possible in the light of the above teachings. It is, therefore, to be understood, that within the scope of the appended claims, the invention may be practiced otherwise than as specifically described.

What is claimed is:

1. Apparatus for pumping water into and out of a dry dock basin, said dry dock basin having a caisson with respective upper and lower selectively closable aperture means extending therethru, said apparatus comprising:
    a composite waterborne craft composed of a floating body and movable body means, attached thereto;
    means guidably attaching said movable body means to said floating body for enabling up and down movement of the movable body means relative to said floating body and for enabling rotation of said movable body means in unison with said floating body about an essentially horizontal axis;
    upper and lower laterally extending pipe means located on said movable body means and spaced apart from each other to enable registration of said pipe means with said aperture means located in the caisson; and
    pump means located on said movable body means and fluidly coupled to said pipe means;
    whereby said movable body means is movable up and down in relation to said floating body and to said caisson to establish positions of registration of said upper and lower pipe means with said upper and lower aperture means respectively to effect upon pump actuation watering and dewatering of the dry dock.

2. Apparatus according to claim 1 wherein said movable body means comprises variably buoyant means.

3. Apparatus according to claim 1 wherein said floating body comprises a plurality of compartments and means for ballasting selected ones thereof, whereby said floating body may be caused to rotate thus enabling rotational movement of said pipe means to positions in and out of registration with said aperture means.

4. Apparatus according to claim 3 wherein said floating body comprises means located thereon for propelling and steering said floating body portion.

5. Apparatus for pumping water into and out of a dry dock basin, said dry dock basin having a caisson with respective upper and lower selectively closable aperture means extending therethru, said apparatus comprising:
    at least one pontoon having longitudinal watertight wall means dividing the interior of said pontoon into at least two elongated watertight compartments;
    means located on said pontoon for selectively ballasting said compartments whereby said pontoon may be rotated about an essentially horizontal axis extending thru the pontoon;
    said pontoon having guide means located at each end;
    movable means located at each end of the pontoon; each of said movable means including a laterally extending upper and lower pipe interconnected by a conduit, said upper and lower pipe on each movable means having locations corresponding to the respective locations of said aperture means in said caisson;
    said movable means having an element for coacting with said guide means whereby said movable means is attached to the pontoon for rotation therewith and is constrained to essentially up and down movement in relation to the pontoon;
    valve means for selectively closing said upper and lower pipes;
    pump means mounted on said movable means and connected to each said conduit;
    whereby upon movement of the pontoon alongside the caisson, said upper and lower pipes may be brought into register with the upper and lower aperture means by virtue of the pontoon rotation and by virtue of the up and down movement of said movable means, thereby enabling water to be pumped into or out of the dry dock basin responsive to predetermined flow conditions established in said upper and lower pipes and aperture means.

6. Apparatus according to claim 5 including support means rigidly connecting said movable means for providing movement of said movable means in unison.

7. Apparatus according to claim 5 including propulsion means mounted on said pontoon.

8. Apparatus according to claim 5 wherein said movable means includes ballasting means for controlling the up and down movements of said movable means.

9. Apparatus according to claim 8 wherein said ballasting means comprises a water-tight casing mounted on said movable means and surrounding the pump means, and conduit means coupling a pump to the exterior of the casing and to the interior space of said casing for varying the buoyancy of said movable means.

10. Apparatus for pumping water into and out of a dry dock basin, said dry dock basin having a caisson with respective upper and lower selectively closable aperture means extending therethru, said apparatus comprising:

- a composite watercraft having a compartmented pontoon portion and a body portion movable up and down in relation to said pontoon portion;
- guide means located on said pontoon portion and connecting said respective portions, said body portion having elements fixed thereto for enabling rotation of said pontoon and body portions about an essentially horizontal axis in unison and for limiting said body portion to up and down movement via said guide means;
- ballastable means mounted in said pontoon portion for enabling ballasting of selected portions of the pontoon portion whereby the pontoon portion may be rotated about an axis thereof, thereby also causing rotation of said body portion connected thereto;
- pump means mounted on said body portion;
- laterally extending pipe means spatially oriented in correspondence to said aperture means and connected to said pump means and having selectively closable portions whereby the pipe means may be mated to said aperture means by virtue of movement of said pontoon and body portions, and under one predetermined flow condition water may be pumped into the dry dock basin via one path thru said aperture and pipe means, and under another flow condition water may be pumped from said dry dock basin via another path thru said aperture means and pipe means.

References Cited by the Examiner

UNITED STATES PATENTS

| 908,016 | 12/08 | Lake | 114—50 |
| 1,537,764 | 5/25 | Good | 114—50 |
| 2,361,868 | 10/44 | Prassel | 114—50 |
| 2,404,869 | 7/46 | Sorrentino | 137—565 X |

FOREIGN PATENTS 417,210  8/10  France.

CHARLES E. O'CONNELL, *Primary Examiner.*

JACOB SHAPIRO, EARL J. WITMER, *Examiners.*